(12) United States Patent
Weber et al.

(10) Patent No.: US 8,508,868 B2
(45) Date of Patent: Aug. 13, 2013

(54) HOLDING ARRANGEMENT FOR AN OPTICAL ELEMENT

(75) Inventors: Ulrich Weber, Ulm (DE); Armin Schoeppach, Aalen (DE); Hubert Holderer, Oberkochen (DE)

(73) Assignees: Carl Zeiss SMT GmbH, Oberkochen (DE); Carl Zeiss Laser Optics GmbH, Oberkochen (DE)

( * ) Notice: Subject to any disclaimer, the term of this patent is extended or adjusted under 35 U.S.C. 154(b) by 36 days.

(21) Appl. No.: 13/359,341

(22) Filed: Jan. 26, 2012

(65) Prior Publication Data

US 2012/0154935 A1    Jun. 21, 2012

Related U.S. Application Data

(63) Continuation of application No. PCT/EP2010/004515, filed on Jul. 23, 2010.

(30) Foreign Application Priority Data

Jul. 31, 2009    (DE) .......................... 10 2009 037 135

(51) Int. Cl.
*G02B 7/02* (2006.01)
*G02B 15/14* (2006.01)

(52) U.S. Cl.
USPC ............................. 359/819; 359/811; 359/694

(58) Field of Classification Search
USPC .................................. 359/694–704, 811–830
See application file for complete search history.

(56) References Cited

U.S. PATENT DOCUMENTS

| | | | |
|---|---|---|---|
| 5,210,648 A | 5/1993 | Bedzyk | |
| 5,220,460 A | 6/1993 | Bedzyk | |
| 5,694,257 A * | 12/1997 | Arnone et al. | 359/822 |
| 6,115,166 A * | 9/2000 | Kotaki | 359/212.1 |
| 6,320,707 B1 * | 11/2001 | Khoshnevisan et al. | 359/824 |
| 6,388,823 B1 | 5/2002 | Gaber et al. | |
| 2004/0095657 A1 | 5/2004 | Takanashi et al. | |
| 2009/0207511 A1 | 8/2009 | Schoeppach et al. | |
| 2012/0019708 A1 | 1/2012 | Morihisa et al. | |

FOREIGN PATENT DOCUMENTS

| | | |
|---|---|---|
| DE | 200 12 046 U1 | 9/2000 |
| DE | 202 20 139 U | 3/2003 |
| DE | 102 12 547 A1 | 10/2003 |
| DE | 10 2008 040 218 | 1/2009 |

(Continued)

OTHER PUBLICATIONS

German office action, with English translation, for corresponding DE Appl No. 10 2009 037 135.4, dated Apr. 27, 2010.

(Continued)

*Primary Examiner* — Mohammed Hasan
(74) *Attorney, Agent, or Firm* — Fish & Richardson P.C.

(57) ABSTRACT

A holding arrangement for an optical element, in particular for a cylindrical lens, includes a basic structure surrounding an optical element and a mounting device by which the optical element is supported on the basic structure. The mounting device has two degrees of freedom so that the optical element can be supported by the mounting device in a manner that allows the optical element to rotate about both about an optical axis and an axis perpendicular to the optical axis. If the optical element is a cylindrical lens, the axis perpendicular to the optical axis can be an axis perpendicular to an axial direction of the cylindrical lens. The disclosure further relates to a manipulator unit for an optical system which includes a holding arrangement.

20 Claims, 3 Drawing Sheets

(56) References Cited

FOREIGN PATENT DOCUMENTS

| JP | 2002-072057 | 3/2002 |
|----|----|----|
| WO | WO 2006/000352 | 1/2006 |
| WO | WO 2006/066706 | 6/2006 |
| WO | WO 2006/119970 | 11/2006 |
| WO | WO 2007/017013 | 2/2007 |

OTHER PUBLICATIONS

The International Search Report and Written Opinion for corresponding PCT Appl No. PCT/EP2010/004515, dated Sep. 22, 2011.
The International Preliminary Report on Patentability for corresponding PCT Appl No. PCT/EP2010/004515, dated Jan. 31, 2012.

* cited by examiner

HOLDING ARRANGEMENT FOR AN OPTICAL ELEMENT

CROSS-REFERENCE TO RELATED APPLICATIONS

This application is a continuation of, and claims benefit under 35 USC 120 to, international application PCT/EP2010/004515, filed Jul. 23, 2010, which claims benefit under 35 USC 119 of German Application No. 10 2009 037 135.4, filed Jul. 31, 2009. International application PCT/EP2010/004515 is hereby incorporated by reference in its entirety.

FIELD

The disclosure relates to a holding arrangement for an optical element with a basic structure surrounding an optical element and a mounting device by which the optical element can be supported on the basic structure. The disclosure further relates to a manipulator unit for an optical system which includes a holding arrangement.

BACKGROUND

Holding arrangements for optical elements are used in optical systems. The precision desired for mounting is generally dependent on the respective purpose of use.

An assembly for mounting an optical component relative to a carrier via at least three articulation points arranged at the outer circumferential region of the optical element is known from WO 2007/017013 A2, in which the optical element is held in a force-fitting manner by elastically resilient elements via the articulation points in at least one direction. The elastically resilient elements are located in mounting device which hold the optical element in a statically determined manner.

An adjustable mount for a cylindrical lens in an optical system, for example the optical system of a laser printer, is known from U.S. Pat. No. 5,220,460. The mount includes a carrier element which is arranged perpendicularly to the optical axis (z axis) and has a flat face on which the cylindrical lens rests under the action of a constant force. An axis extending parallel to an axial direction of the cylindrical lens is referred to in U.S. Pat. No. 5,220,460 as the x direction. The adjustable mount is intended to allow a rotational movement about the optical axis and a translational movement in the y direction for an adjustment. For this purpose, the cylindrical lens is mounted at two corners opposing each other in the x-y plane via a rib acting as a joint, a spring element and two set screws. Tilting about the two axes extending perpendicularly to the optical axis is sufficiently ensured by the flat face on which the cylindrical lens rests for application in a laser printer. In contrast to the terminology used in U.S. Pat. No. 5,220,460, the axis extending parallel to the axial direction of a cylindrical lens will be referred to hereinafter as the y axis.

Optical elements are also used in material processing devices, for example in laser annealing devices. An optical system of this type is described for example in WO 2006/066706. In devices of this type, a laser beam is used to fuse a layer for example, a silicon layer, onto a substrate. In this case, the laser beam impinges onto the layer to be fused as a very narrow line beam. The layer and the laser beam are displaced relative to each other transversely to a line formed by the laser beam, so that the laser beam is guided in a planar manner over the substrate, which is known as the "panel".

As these devices illuminate the panel with a long, but very narrow field, cylindrical lenses, i.e. lenses having just one direction of curvature, are used.

SUMMARY

The disclosure provides an arrangement for mounting an optical element, in particular a cylindrical lens, which ensures precise and adjustable mounting, at least in sensitive centering directions of the optical element.

According to one aspect of the disclosure, a holding arrangement for an optical element, in particular for a cylindrical lens, is provided with a basic structure surrounding a received optical element, and a mounting device by which the received optical element can be supported on the basic structure. The mounting device has two degrees of freedom so that the optical element can be supported by the mounting device in a manner that allows the optical element to rotate about both about an optical axis (z axis) and a first axis perpendicular to the optical axis. An example of the first axis perpendicular to the optical axis is an axis (x axis) which extends perpendicularly to an axial direction of the cylindrical lens.

A rigid body movement can be described by six degrees of freedom. In the case of a mounting device with two degrees of freedom, movements along the four remaining directions of rigid body movement are blocked. A mounting device of this type with two degrees of freedom allows precise mounting of the optical element and permits exact adjustment of the mounted optical element about both the optical axis and an axis perpendicular thereto. The basic structure surrounding the optical element prevents the mounting device from reaching into an optical beam path.

In the context of the disclosure, an axis extending perpendicularly to the optical axis and perpendicularly to the cylinder axis or axial direction is referred to as the transverse axis. Optical elements such as cylindrical lenses have four sensitive centering directions, namely a direction of rotation or a tilting direction about the optical axis, a direction of translation along the transverse axis, i.e. in a direction extending perpendicularly to the optical axis and if applicable to a cylindrical axis, a direction of rotation or tilting direction about this transverse axis and a direction of translation along the optical axis. According to the disclosure, the optical element is mounted so that only degrees of rotational freedom can be adjusted. The mounting device prevents the optical element from becoming maladjusted in the two relevant directions of translation during an adjustment of the degrees of rotational freedom.

An inner structure, which carries the optical element and on which the mounting device acts, is preferably provided. A connection between the inner structure and the optical element is preferably substantially rigid, so that the optical element and the inner structure act as a common component for adjustment and/or mounting. The inner structure preferably has a face which is substantially circular when viewed from above and is arranged in a complementary receiving opening of the basic structure. This allows good rotational movement about the optical axis in the case of a simple geometrical shape and thus cost-effective manufacture.

According to a further aspect, the mounting device has two articulation points arranged in the region of the first axis at opposing sides of the basic structure. The optical element is mounted via the inner structure between the articulation points at the first axis. In one configuration, the articulation points each have at least three degrees of freedom. The articulation points block a translational movement of the optical element in relation to the basic structure in the direction of the optical axis. The articulation points also block a rotational movement about a second axis (y axis) which lies perpendicularly to both the optical axis and the first axis and which intersects the optical axis and the first axis at a common point. In addition, in one configuration, a translational movement is blocked in the direction of the first axis. In other words, the articulation points support the optical element at least against a translational movement parallel to the direction of the optical axis. In one configuration, a movement parallel to the direction of the first axis (x axis) is likewise blocked. In other configurations, a movement parallel to the direction of the first axis (x axis) is admissible to allow an expansion due to heating. A translational movement parallel to the direction of the second axis (y axis), which extends perpendicularly to both the optical axis and the first axis, is not blocked so that the articulation points do not obstruct rotation about the optical axis which is set apart from the articulation points.

The articulation points have preferably at least one fixed body joint, in particular a leaf spring joint. A plane of the leaf spring joints coincides preferably with a plane spanned by the optical axis and the first axis, a longitudinal direction of the leaf spring joints extending parallel to the first axis. Torsion of the leaf spring joints allows a rotational movement or a tilting of the received optical element about the first axis. Bending, for example in the shape of an S, of the leaf spring joints allows displacement at the articulation points parallel to the direction of the second axis and thus a rotational movement of the optical element about the optical axis. Translational movements along the first axis and/or along the optical axis are blocked. In one configuration, the fixed body joints are in this case configured in one piece with the inner structure. Preferably, the basic structure and the articulation points are positioned substantially in a plane perpendicular to the optical axis. In other configurations, an inner structure and the basic structure are arranged offset with respect to the optical axis, a connecting articulation point extending in the direction of the optical axis.

Preferably, the mounting device also has at least a first coupling unit arranged between the articulation points and by which the optical element is supported in the direction of the second axis. The coupling unit is arranged on the basic structure between the articulation points. In one configuration, the coupling unit is arranged substantially symmetrically between the articulation points. The coupling unit is thus positioned symmetrically to the second axis. In other configurations, the coupling unit is offset in the direction of one of the articulation points.

The coupling unit has preferably at least two degrees of freedom, so that the coupling unit does not obstruct at least rotational movements of the optical element about both the optical axis and the first axis, whereas a translational movement of the optical element in relation to the basic structure in the direction of the second axis is supported or blocked via the coupling unit.

In an advantageous configuration, the coupling unit has an intermediate element. The optical element is coupled to the intermediate element via at least a first connecting structure, and the intermediate element is coupled to the basic structure via at least a second connecting structure. The connecting structures have preferably fixed body joints, in particular leaf spring joints. In this case, in one configuration, the intermediate element is shaped in one piece with the inner structure, a separation being carried out by fixed body joints, in particular by leaf spring joints. The combination of the intermediate element and the two connecting structures provides a cost-effective and compact coupling unit having two degrees of translational freedom in the region of the coupling unit, whereas the third degree of translational freedom is blocked. In one configuration, a plane of the leaf spring joints of the first connecting structure lies perpendicular to a plane spanned by the first and the second axis. The plane of the leaf spring joints encloses in this case an angle of between 0° and 90° with the plane defined by the first axis and the optical axis. The orientation of the plane of the leaf spring joints preferably is selected so that the optical axis lies in the extension of the plane of the leaf spring joints. In the case of deformation, for example in the shape of an S, of the leaf spring joints, a rotational movement of the optical element about the optical axis is thus possible. A plane of the leaf spring joints of the second connecting structure extends preferably parallel to the plane spanned by the first axis and the second axis. In the case of deformation, for example in the shape of an S, of the leaf spring joints, a translational movement along the optical axis in the region of the coupling unit, and thus a rotational movement of the optical element about the first axis, is in this way possible.

In a further configuration, at least one adjusting unit, which can be used to stimulate a translatory movement in the direction of the optical axis and a translatory movement in the direction of the first axis, is provided between the articulation points, so that the received optical element is adjustable via a rotational movement about the first axis and/or about the optical axis. For good supporting and optimized utilization of the overall space, the adjusting unit and the coupling unit are arranged preferably opposing each other at two sides of the optical element, in particular mirror-symmetrically to the second axis.

According to a further aspect of the disclosure, the adjusting unit has a stationary part arranged on the basic structure and an output part. The stationary part and the output part are joined together via at least one, preferably two setting levers. Preferably, the setting levers are connected to the stationary part and/or to the output part by fixed body joints, in particular by leaf spring joints.

The output part is preferably coupled to the inner structure by at least one fixed body joint, in particular a leaf spring joint. A plane of this leaf spring joint extends preferably parallel to a plane spanned by the optical axis and the first axis. The leaf spring joint allows in this way a local compensating movement by rotational movements about an axis parallel to the first axis and an axis parallel to the optical axis.

A manipulator unit for an optical system can include a holding arrangement according to the disclosure. A manipulator unit of this type can for example advantageously be used in an optical system according to WO 2006/066706.

The foregoing and further features emerge not only from the claims but also from the description and the drawings. The individual features can each be realized in separately or together in the form of sub-combinations in embodiments of the disclosure and in other fields and can represent advantageous and also independently patentable embodiments.

DETAILED DESCRIPTION

Figure 1:
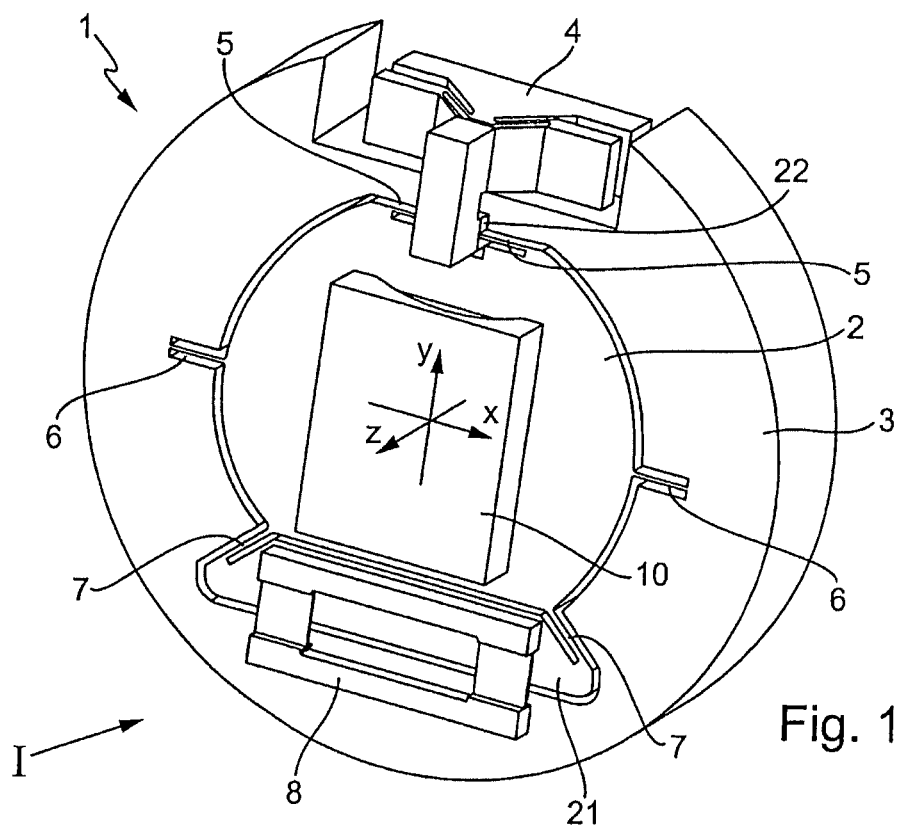
FIG. 1 is a schematic, perspective view of a manipulator unit.

FIG. 1 shows schematically a manipulator unit 1 with a holding arrangement according to the disclosure for an optical element 10. In the illustrated exemplary embodiment, the optical element 10 is configured as a cylindrical lens.

The Cartesian coordinates x, y and z are also illustrated in FIG. 1. A direction of light or optical axis is in this case referred to as the z axis. An axis extending parallel to the axial direction of the cylindrical lens (cylinder axis) is referred to as the y axis. An axis extending perpendicularly to the axial direction and the direction of light is referred to as the transverse axis or x axis.

In the illustrated exemplary embodiment, the holding arrangement includes an inner structure 2 which carries the optical element 10. The holding arrangement includes an outer structure or basic structure 3 and a mounting device by which the inner structure 2, and thus the optical element 10, is supported on the basic structure 3. The optical element 10 is supported by the illustrated mounting device to allow rotational adjustment of the optical element about the z axis and/or about the x axis. At the same time, the mounting device prevents the optical element 10 from being displaced along the x axis or the z axis during rotational movements about the z axis and/or about the x axis.

An adjusting unit 4, which is connected to the inner structure 2 via leaf spring joints 5, causes an adjusting movement of the optical element 10 for adjustment.

The mounting device includes two articulation points 6 which are implemented in the illustrated exemplary embodiment as leaf spring joints and couple the inner structure 2 to the basic structure 3 in the region of the x axis. As a result of the articulation points 6, which are implemented as leaf spring joints, the inner structure 2 is supported in relation to the basic structure 3 against translations parallel to the x axis and/or parallel to the z axis.

Furthermore, a coupling unit 1 includes a first connecting structure 7 implemented by leaf spring joints, an intermediate element 21 and a second connecting structure 8 likewise having leaf spring joints. The inner structure 2 is supported by the coupling unit 1 relative to the basic structure 3 against translational movements parallel to the y axis.

In connections by leaf spring joints, a relative movement of the coupled components is achieved by deformation of the joint region as a whole. Deformation is in this case is possible both by bending about axes parallel to the narrow sides of the leaf spring joints and by torsion about axes parallel to the longitudinal sides of the leaf spring joints.

In the illustrated exemplary embodiment, a plane of the articulation points 6, which are configured as leaf spring joints, coincides with the plane spanned by the z axis and the x axis. The leaf spring joints of the articulation points 6 thus prevent a translational movement of the inner structure 2 relative to the basic structure 3 parallel to the x axis and parallel to the z axis. In addition, the leaf spring joints prevent a rotational movement of the inner structure 2 relative to the basic structure 3 about the y axis. The leaf spring joints of the articulation points 6 allow a torsional movement, a tilting movement or movement of rotation of the inner structure 2 about the x axis relative to the basic structure 3 during a torsional movement of the leaf spring joints. In addition, the leaf spring joints 6 are deformable in the shape of an S on account of external loading. The S-shaped bending of the leaf spring joints of the articulation points 6 allows a translational movement of the inner structure 2 at the articulation points 6 parallel to the y axis and thus a rotational movement of the optical element 10 about the z axis in relation to the basic structure 3.

The optical element 10 is supported in the y direction by the coupling unit 1. The leaf spring joints of the connecting structure 7 separate in this case the intermediate region 21 from the inner structure 2. The intermediate region 21 is connected to the basic structure 3 by the connecting structure 8. The leaf spring joints of the first connecting structure 7 are oriented so that their plane lies perpendicular to a plane spanned by the x axis and the y axis. The plane of the leaf spring joints encloses in this case an angle, for example an angle of between approximately 10° and approximately 70°, with a plane spanned by the x axis and the z axis. The plane of the leaf spring joints is in this case oriented so that the z axis lies in the extension of the plane. S-shaped bending of the leaf spring joints of the first connecting structure 7 thus allows a rotational movement of the inner structure 2 about the z axis in relation to the intermediate region 21. A plane of the leaf spring joints of the second connecting structure 8 extends parallel to a plane spanned by the x axis and the y axis. S-shaped bending of the leaf spring joints thus allows displacement of the intermediate region 21 relative to the basic structure 3 parallel to the z axis. This displacement allows a rotational movement of the inner structure 2, which is mounted at the articulation points 6 so as to be rotatable about the x axis, and thus of the optical element 10 about the x axis relative to the basic structure 3. In combination, the leaf spring joints of the first connecting structure 7 and the leaf spring joints of the second connecting structure 8 thus cause supporting of the inner structure 2 in relation to the basic structure 3 parallel to the direction of the y axis without obstruction of a rotational movement of the inner structure 2 about the x axis or about the z axis.

In the illustrated exemplary embodiment, the inner structure 2, and thus the optical element 10, is moved in relation to the basic structure 3, for adjustment, by the adjusting unit 4.

Figure 2:
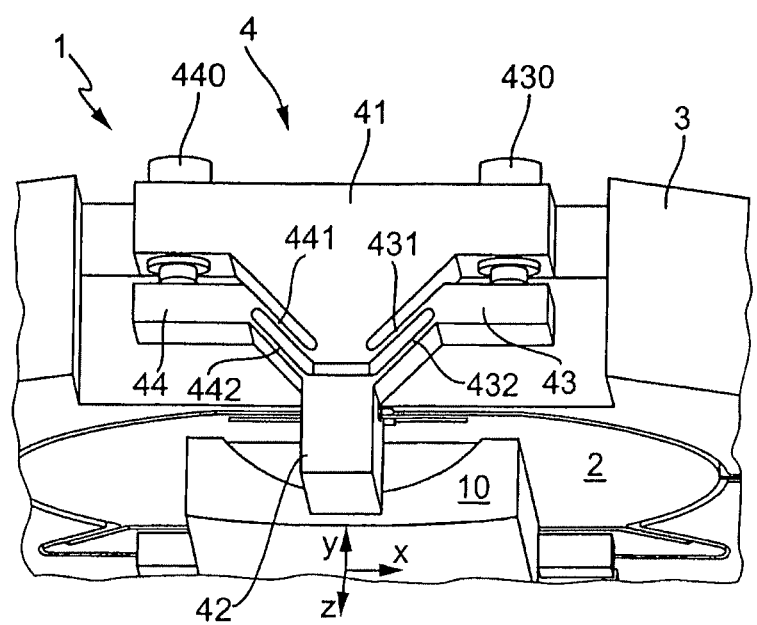
FIG. 2 is a schematic, perspective view of the manipulator unit according to FIG. 1, focused on an adjusting unit of the manipulator unit.

FIG. 2 is a perspective view, focusing on the adjusting unit 4. As may be seen in FIG. 2, the adjusting unit 4 includes a stationary part 41 which is securely connected to the basic structure 3. The adjusting unit 4 further includes an output part 42 which is coupled to the inner structure 2. The output part 42 is rigidly connected to a region 22 which may be seen in FIG. 1 and is coupled to the inner structure 2 via leaf spring joints 5. The adjusting unit 4 further includes setting levers 43, 44 which are connected to the stationary part 41 via first leaf spring joints 431, 441 and to the output part 42 via second leaf spring joints 432, 442. The setting levers 43, 44 are adjustable by setting drives 430, 440, an adjusting of the setting levers 43, 44 being transmitted to the output part 42 by the leaf spring joints 431, 441, 432, 442. In relation to the disclosure, the term "setting drives" refers to any desired manually, force and/or motor-actuated element including set screws, motor-operated pistons and the like.

Figure 3:
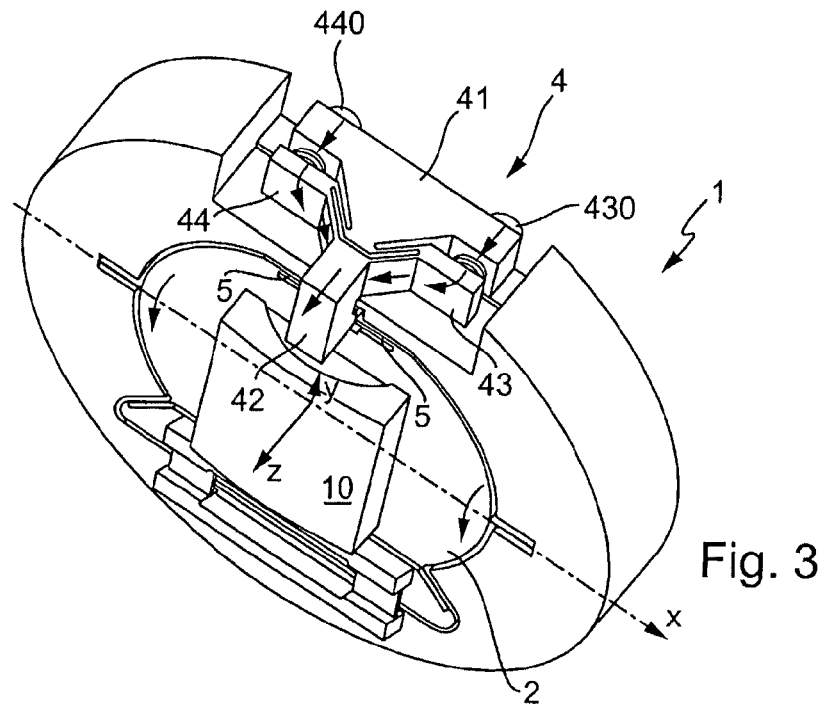
FIG. 3 is a schematic, perspective view of the manipulator unit according to FIG. 1 during a rotational movement about an optical axis.

FIG. 3 shows schematically a drive of the setting drives 430, 440 for displacement of the output part 42 in the z direction. The displacement of the output part 42 in the z direction causes tilting of the inner structure 2 and thus the optical element 10 about the x axis. As may be seen in FIG. 3, the setting drives 430, 440 are operated in parallel for this purpose, so that both setting levers 43, 44 are displaced in the positive z direction. A tilting angle, which is undesirable during the adjusting movement, at a linking point of the adjusting unit 4 is compensated for in this case by torsion of the leaf spring joints 5.

Figure 4:
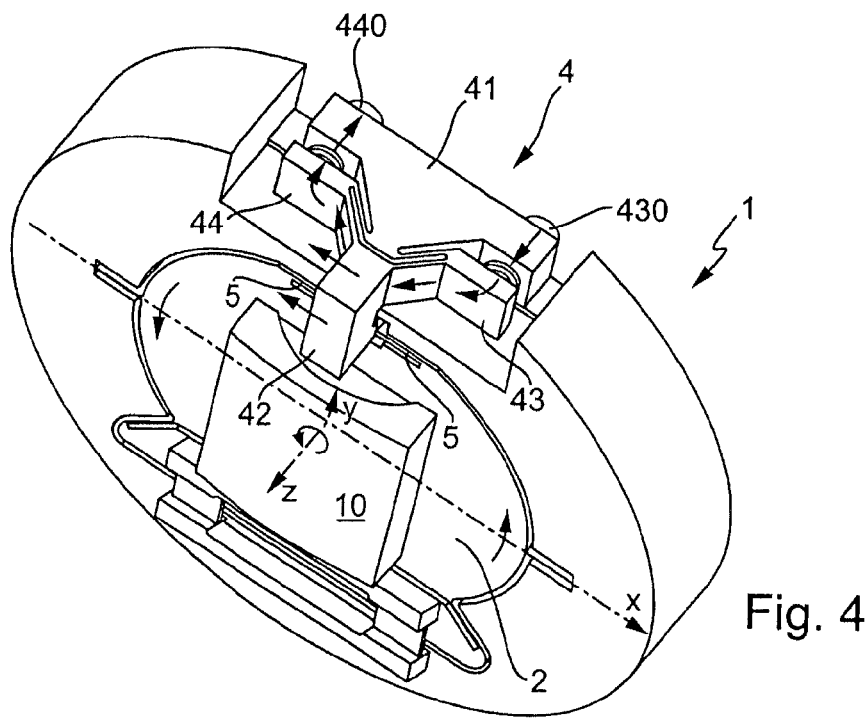
FIG. 4 is a schematic, perspective view of the manipulator unit according to FIG. 1 during a rotational movement about an optical axis.

FIG. 4 shows a drive of the setting drives 430, 440 for a rotational movement of the optical element 10 about the z axis. For this purpose, a setting drive, in the illustrated exemplary embodiment the setting drive 430, is operated so that the associated setting lever 43 is displaced in the positive z direction. The second setting drive 440 is operated so that the setting lever 44 is moved in the negative z direction. The combination of the movement of the setting levers 43, 44 causes displacement of the output part 42 in the x direction, in the illustrated exemplary embodiment in the negative x direction. As a result, the inner structure 2, and thus the optical element 10, is rotated about the z axis in the positive direction. The rotational movement between the inner structure 2 and the adjusting unit 4 is in this case compensated for in the linking region of the adjusting unit by the leaf spring joints 5.

Figure 5:
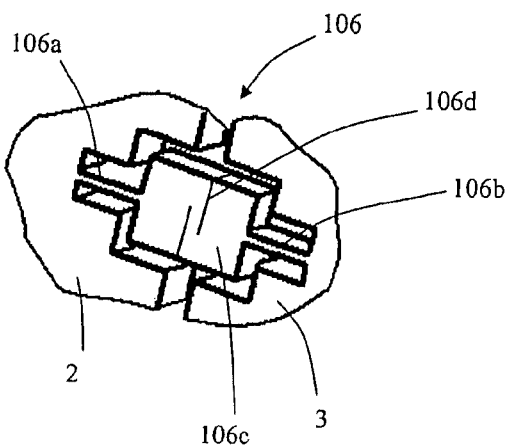
FIG. 5 is a schematic, perspective view of a first variant of an articulation point for a manipulator unit according to FIG. 1.

FIG. 5 is a schematic, perspective view of a first variant of an articulation point 106, which is provided instead of the articulation point 6 according to FIGS. 1 to 4, for a manipulator unit according to FIG. 1. The articulation point 106 according to FIG. 5 includes two leaf spring joints 106a, 106b which are coupled to each other via an intermediate body 106c. The intermediate body 106c has slots 106d allowing a compensating movement in the direction of the x axis. In one configuration, the connection to the adjusting unit 4, the connecting structure 7 and/or the connecting structure 8 are, like the articulation point 106, implemented via a plurality of leaf spring joints connected in series.

In the embodiments according to FIGS. 1 to 4, the basic structure 3 and the inner structure 2 are positioned substantially in a plane perpendicular to the optical axis z. In an alternative configuration, the inner structure 2 is offset with respect to the basic structure 3 parallel to the direction of the optical axis z.

Figure 6:
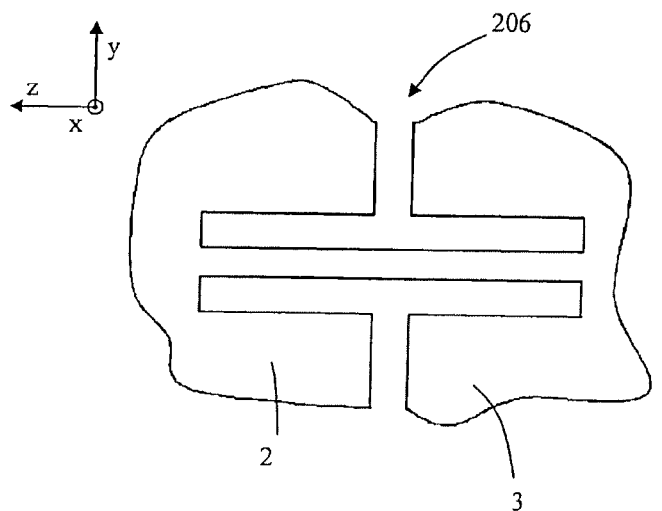
FIG. 6 is a schematic view of a second variant of an articulation point for a manipulator unit according to FIG. 1.

FIG. 6 is a schematic view of a variant of an articulation point 206 for a manipulator unit according to FIG. 1, the inner structure 2 being arranged offset with respect to the basic structure 3 parallel to the direction of the optical axis z. The articulation point 206, which is embodied as a leaf spring joint, likewise allows a relative displacement between the basic structure 3 and the inner structure 2 in the direction of the second axis y and tilting or rotation of the components 2, 3 about the first axis x. The articulation point 206 thus has the same degrees of freedom as the articulation point 6 according to FIGS. 1 to 4.

Figure 7:
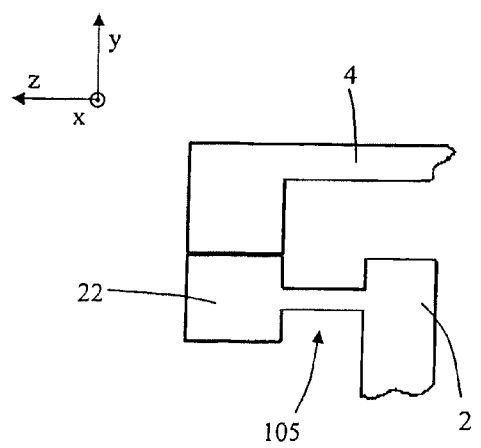
FIG. 7 is a schematic, perspective view of a variant of a connecting point for an adjusting unit of a manipulator unit according to FIG. 1.

FIG. 7 is a schematic view of a variant of a connection of the adjusting unit 4 to the inner structure 2, a part 22 for linking to the adjusting unit being arranged offset with respect to the inner structure 2 parallel to the direction of the optical axis z. In the illustrated exemplary embodiment, the connection is in this case implemented via a leaf spring joint 105. The leaf spring joint 105 allows a tilting movement between the part 22 and the inner structure 2 about an axis extending parallel to the optical axis z, so that tilting of the adjusting unit 4 is compensated for when movement is introduced.

What is claimed is:

1. A holding arrangement, comprising:
   a basic structure configured to surround an optical element;
   a mounting device by which the optical element can be supported on the basic structure; and
   an inner structure configured to carry the optical element, wherein:
   the mounting device is configured to act on the inner structure;
   the mounting device has two degrees of freedom so that the optical element can be supported by the mounting device in a manner that allows the optical element to rotate about both an optical axis and a first axis perpendicular to the optical axis;
   the mounting device has two articulation points arranged in a region of the first axis at opposing sides of the basic structure;
   the articulation points couple the inner structure to the basic structure;
   each of the articulation points has at least three degrees of freedom;
   the articulation points block translation of the optical element relative to the basic structure parallel to a direction of the optical axis; and
   the articulation points block rotation of the optical element about a second axis which lies perpendicularly to the optical axis and the first axis and intersects the optical axis and the first axis at a common point.

2. The holding arrangement of claim 1, wherein the optical element comprises a cylindrical lens, and the first axis extends perpendicularly to an axial direction of the cylindrical lens.

3. The holding arrangement of claim 1, wherein the articulation points comprise a fixed body joint.

4. The holding arrangement of claim 3, wherein the fixed body joint comprises a leaf spring joint.

5. The holding arrangement of claim 1, wherein the mounting device comprises a coupling unit arranged between the articulation points, and the optical element can be supported by the mounting device in a direction of the second axis.

6. The holding arrangement of claim 5, wherein the coupling unit has at least two degrees of freedom, and the coupling unit can block a translational movement of the optical element relative to the basic structure in the direction of the second axis.

7. The holding arrangement of claim 5, wherein the coupling unit comprises an intermediate element, the optical element is coupled to the intermediate element via a first connecting structure, and the intermediate element is coupled to the basic structure via a second connecting structure.

8. The holding arrangement of claim 7, wherein the first connecting structure comprises a first fixed body joint, and the second connecting structure comprises a second fixed body joint.

9. The holding arrangement of claim 7, wherein the first connecting structure comprises a first leaf spring joint, and the second connecting structure comprises a second leaf spring joint.

10. The holding arrangement of claim 1, further comprising an adjusting unit configured to stimulate a translatory movement in the direction of the optical axis and a translatory movement in the direction of the first axis, wherein the adjusting unit is between the articulation points so that the optical element is adjustable via rotation about the first axis or about the optical axis.

11. The holding arrangement of claim 10, wherein the adjusting unit comprises a stationary part an outer part, the stationary part and the outer part are joined together via at least one setting lever, and the stationary part is arranged on the basic structure.

12. The holding arrangement of claim 11, wherein the stationary part and the outer part are joined together via two setting levers.

13. The holding arrangement of claim 11, wherein at least one of the setting levers is connected via fixed body joints to the stationary part and/or to the output part.

14. The holding arrangement of claim 11, wherein the output part is supported in relation to the inner structure via a fixed body joint.

15. The holding arrangement of claim 14, wherein the fixed body joint comprises a leaf spring joint.

16. A unit, comprising:
a holding arrangement according to claim 1,
wherein the unit is a manipulator unit.

17. The arrangement of claim 16, wherein the optical element comprises a cylindrical lens, and the first axis extends perpendicularly to an axial direction of the cylindrical lens.

18. An arrangement, comprising:
an optical element;
an inner structure carrying the optical element;
a basic structure surrounding the optical element; and
a mounting device by which the optical element is supported on the basic structure wherein:
the mounting device is configured to act on the inner structure;
the mounting device has two degrees of freedom so that the optical element can be supported by the mounting device in a manner that allows the optical element to rotate about both an optical axis and a first axis perpendicular to the optical axis;
the mounting device has two articulation points arranged in a region of the first axis at opposing sides of the basic structure;
the articulation points couple the inner structure to the basic structure;
each of the articulation points has at least three degrees of freedom;
the articulation points block translation of the optical element relative to the basic structure parallel to a direction of the optical axis; and
the articulation points block rotation of the optical element about a second axis which lies perpendicularly to the optical axis and the first axis and intersects the optical axis and the first axis at a common point.

19. The arrangement of claim 18, wherein the optical element comprises a cylindrical lens, and the first axis extends perpendicularly to an axial direction of the cylindrical lens.

20. A unit, comprising:
a holding arrangement according to claim 18,
wherein the unit is a manipulator unit.

\* \* \* \* \*